United States Patent
Liao

(10) Patent No.: US 11,589,239 B2
(45) Date of Patent: Feb. 21, 2023

(54) METHODS OF EFFICIENT WIDEBAND OPERATION FOR INTRA-BAND NON-CONTIGUOUS SPECTRUM

(71) Applicant: MEDIATEK INC., Hsin-Chu (TW)

(72) Inventor: Pei-Kai Liao, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 178 days.

(21) Appl. No.: 16/733,580

(22) Filed: Jan. 3, 2020

(65) Prior Publication Data

US 2020/0221308 A1 Jul. 9, 2020

Related U.S. Application Data

(60) Provisional application No. 62/790,543, filed on Jan. 10, 2019, provisional application No. 62/788,177, filed on Jan. 4, 2019.

(51) Int. Cl.
*H04W 16/14* (2009.01)
*H04L 5/00* (2006.01)
(Continued)

(52) U.S. Cl.
CPC ............ *H04W 16/14* (2013.01); *H04L 5/001* (2013.01); *H04W 72/042* (2013.01); *H04W 72/0453* (2013.01); *H04W 74/0833* (2013.01)

(58) Field of Classification Search
CPC ..... H04W 16/14; H04W 72/04; H04W 72/12; H04W 72/042; H04W 72/0453;
(Continued)

(56) References Cited

U.S. PATENT DOCUMENTS 10,284,404 B2    5/2019  Park et al. ............. H04L 27/00
2015/0156045 A1* 6/2015  Lee ..................... H04L 27/2607
                                                                 375/260
(Continued)

FOREIGN PATENT DOCUMENTS

CN    108809597 A    5/2017
CN    108934075 A    5/2017
(Continued)

OTHER PUBLICATIONS

U.S. Appl. No. 62/681,465, filed Jun. 6, 2018.*
(Continued)

*Primary Examiner* — Mohammad S Anwar
(74) *Attorney, Agent, or Firm* — Imperium Patent Works; Zheng Jin

(57) ABSTRACT

A method of efficient wideband operation for intra-band non-contiguous spectrum using extending bandwidth part (BWP) configuration is proposed. The BWP definition is extended to cluster BWPs to aggregate distributed spectrum blocks within a frequency range (e.g., 200 MHz) by single carrier operation and facilitate UE to filter out the transmission of unknown RAT between any two of the distributed spectrum blocks. In addition, the cluster BWP configuration enables dynamic aggregation of the number and location of the distributed spectrum blocks based on LBT results in unlicensed spectrum. Specifically, the BWP definition is extended to a group of one or multiple radio resource clusters, each of which contains a set of contiguous PRBs in frequency domain within the associated carrier.

22 Claims, 5 Drawing Sheets

(51) Int. Cl.
*H04W 74/08* (2009.01)
*H04W 72/04* (2009.01)
*H04W 72/0453* (2023.01)

(58) Field of Classification Search
CPC ............... H04W 74/0833; G01S 7/021; H04L 27/0006; H04L 5/001
See application file for complete search history.

(56) References Cited

U.S. PATENT DOCUMENTS

| | | | | |
|---|---|---|---|---|
| 2018/0279229 | A1 | 9/2018 | Dinan et al. | G04W 52/146 |
| 2018/0279262 | A1 | 9/2018 | Babaei et al. | H04W 72/04 |
| 2019/0313377 | A1* | 10/2019 | Abdoli | H04L 1/0072 |
| 2019/0380147 | A1* | 12/2019 | Zhang | H04W 74/0816 |
| 2020/0008131 | A1* | 1/2020 | Chakraborty | H04W 72/0453 |
| 2020/0204325 | A1* | 6/2020 | Liu | H04W 24/10 |
| 2020/0344030 | A1* | 10/2020 | Cheng | H04W 76/27 |

FOREIGN PATENT DOCUMENTS

| | | |
|---|---|---|
| CN | 108496385 A | 3/2018 |
| CN | 108781377 A | 6/2018 |
| CN | 108886804 A | 6/2018 |
| CN | 109076553 A | 6/2018 |
| CN | 109075878 A | 8/2018 |
| WO | WO2018121621 A1 | 12/2016 |
| WO | WO2018227622 A1 | 6/2017 |

OTHER PUBLICATIONS

Taiwan IPO, office action for related TW patent application 109100293 (no English translation is available) dated Nov. 30, 2020 (7 pages).
R2-1816265 3GPP TSG-RAN WG2 Meeting #104, OPPO, "BWP switching due to LBT", Splkane, USA, Nov. 12-16, 2018 (4 pages) *section 2.3*.
International Search Report and Written Opinion of International Search Authority for PCT/CN2020/070448 dated Mar. 19, 2020 (9 pages).
China IPO Office Action for related application 202080001384.2 (no English translation available), dated Jan. 5, 2022 (12 Pages).
R2-1812343, MediaTek, "Enhancements to the RACH procedure for NR-U", 3GPP TSG-RAN WG2 meeting #103, Aug. 20-24, 2018 (4 pages).

* cited by examiner

METHODS OF EFFICIENT WIDEBAND OPERATION FOR INTRA-BAND NON-CONTIGUOUS SPECTRUM

CROSS REFERENCE TO RELATED APPLICATIONS

This application claims priority under 35 U.S.C. § 119 from U.S. Provisional Application No. 62/788,177, entitled "Methods of efficient Wideband Operation for Intra-band Non-contiguous Spectrum," filed on Jan. 4, 2019; U.S. Provisional Application No. 62/790,543, entitled "Methods of efficient Wideband Operation for Intra-band Non-contiguous Spectrum," filed on Jan. 10, 2019, the subject matter of which is incorporated herein by reference.

TECHNICAL FIELD

The disclosed embodiments relate generally to wireless network communications, and, more particularly, to wideband operation for intra-band non-contiguous spectrum in 5G new radio (NR) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA". In such a solution, an established communication protocol such as LTE and 5G New Radio (NR) can be used over the licensed spectrum to provide a first communication link, and LTE/NR can also be used over the unlicensed spectrum to provide a second communication link. In New Radio-Unlicensed (NR-U), any downlink and uplink access have to follow the listen-before-talk (LBT) channel access procedure, as unlicensed frequencies are also used by other networks such as WiFi.

The bandwidth shortage increasingly experienced by mobile carriers has motivated the exploration of the under-utilized Millimeter Wave (mmWave) frequency spectrum around 30G and 300G Hz for the next generation 5G broadband cellular communication networks. 5G NR beamforming wireless systems support UEs operating with single wideband carrier and UEs operating with intra-band carrier aggregation (CA) over the same contiguous spectrum simultaneously. However, for intra-band non-contiguous spectrum in a licensed band, the resource aggregation may result in multiple serving radio access technologies (RATs) to be non-contiguous along frequency domain. For intra-band contiguous or non-contiguous spectrum based on LBT result in an unlicensed band, the resource aggregation may result in multiple serving RATs to be occupied over different 20 MHz subchannels at different time, as a base station (BS) or a UE needs to perform LBT per subchannel before data transmission.

The multiple serving RATs for intra-band contiguous or non-contiguous spectrum in a licensed or an unlicensed band can be configured as independent carriers under carrier aggregation. However, such method would increase signaling overhead as each independent carrier requires its own control channel. Further, due to different LBT results in subchannels, the radio resources of some subchannels would be wasted. A solution is sought to aggregate distributed spectrum blocks within a frequency range (e.g., 200 MHz) by single carrier operation and facilitate UE to filter out the transmission of unknown RAT between any two of the distributed spectrum blocks. In addition, a solution is sought to enable dynamic aggregation of the number and location of the distributed spectrum blocks based on LBT results.

SUMMARY

A method of efficient wideband operation for intra-band non-contiguous spectrum using extending bandwidth part (BWP) configuration is proposed. The BWP definition is extended to cluster BWPs to aggregate distributed spectrum blocks within a frequency range (e.g., 200 MHz) by single carrier operation and facilitate UE to filter out the transmission of unknown RAT between any two of the distributed spectrum blocks. In addition, the cluster BWP configuration enables dynamic aggregation of the number and location of the distributed spectrum blocks based on LBT results. Specifically, the BWP definition is extended to a group of one or multiple radio resource clusters, each of which contains a set of contiguous PRBs in frequency domain within the associated carrier. UE receives MIB/SIB that contains configuration for an initial DL BWP and UL BWP for initial access and RACH procedure. UE-specific single-cluster or multi-cluster BWP can be further configured via dedicated RRC signaling.

In one embodiment, a UE receives a high-layer signaling of a set of downlink (DL) or uplink (UL) bandwidth part (BWP) configurations from a base station over an initial DL BWP in a single carrier bandwidth. Each DL or UL BWP contains a single or multiple radio resource clusters. Each radio resource cluster contains a set of contiguous resource blocks (RBs) in frequency domain. The radio resource clusters in a DL or UL BWP is contiguous or non-contiguous. The UE performs a random-access channel (RACH) procedure using the initial DL BWP and an initial uplink (UL) BWP. The UE receives a DL or UL BWP switch signal over the initial DL BWP to switch from the initial DL or UL BWP to an active DL or UL BWP, respectively.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
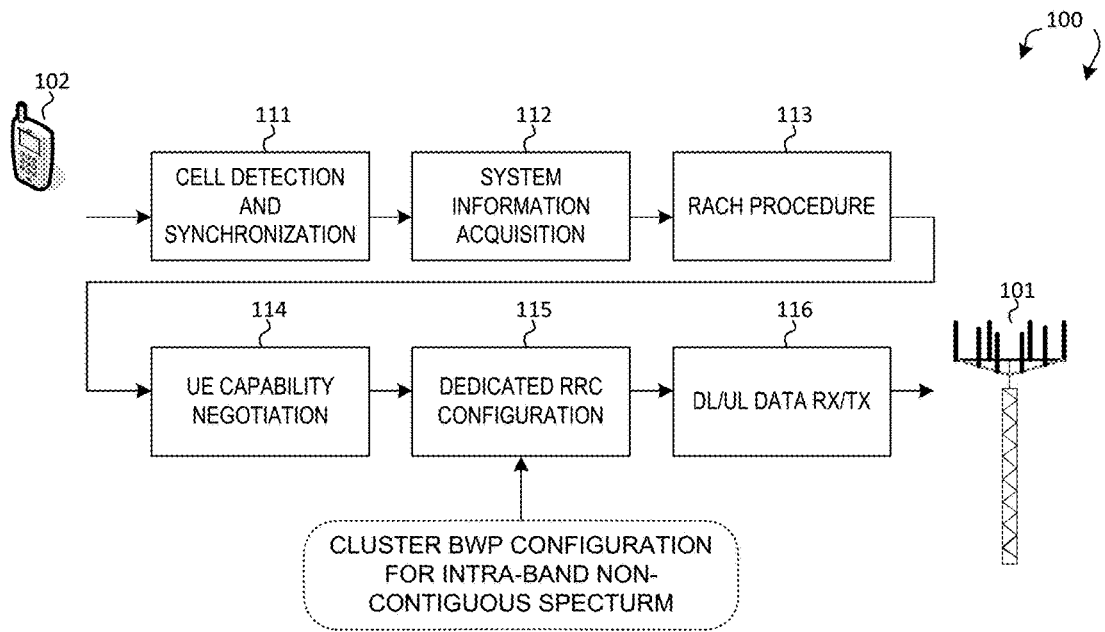
FIG. 1 illustrates a wireless communications system supporting wideband operation for intra-band non-contiguous spectrum using cluster bandwidth part (BWP) configuration in accordance with a novel aspect.

FIG. 1 illustrates a wireless communications system 100 supporting wideband operation for intra-band non-contiguous spectrum using cluster bandwidth part (BWP) configuration in accordance with a novel aspect. 5G new radio (NR) mobile communication network 100 comprises a base station BS/gNodeB 101 and a user equipment UE 102. FIG. 1 shows the procedure for UE to start a connection with its serving base station. In step 111, UE 102 performs cell detection and synchronization. In step 112, UE 102 performs system information acquisition. In step 113, UE 102 performs random-access procedure over a random-access channel (RACH). In step 114, UE 102 performs UE capability negotiation with BS 101. In step 115, UE 102 receives dedicated radio resource control (RRC) configuration from BS 101. In step 116, UE performs downlink (DL) data reception and/or uplink (UL) data transmission.

When there is a downlink packet to be sent from gNodeB to UE, each UE gets a downlink assignment, e.g., a set of radio resources in a physical downlink shared channel (PDSCH). When a UE needs to send a packet to gNodeB in the uplink, the UE gets a grant from the gNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling.

To save UE power consumption, multiplex UEs using different bandwidths or numerologies (e.g. cyclic prefix and subcarrier spacing), and enable efficient spectrum utilization over a wide bandwidth, 5G NR introduces the concept of bandwidth part (BWP). Usage scenarios of BWP operation includes the following: 1) enabling reduced UE bandwidth capability within a wideband carrier; 2) enabling reduced UE power energy consumption by bandwidth adaptation; 3) enabling UE using different numerologies in FDM within a wideband carrier. For each UE-specific serving cell corresponding to a component carrier (CC) and a gNB, one or more DL BWPs and one or more UL BWPs can be configured by dedicated RRC for a UE, and UE is required to monitor at most one uplink BWP and downlink BWP at the same time. The downlink BWP and uplink BWP which is being used or monitored by the UE is called active BWP, e.g. active DL BWP and active UL BWP respectively. As a result, power consumption to monitor the downlink can be reduced because UE is only required to monitoring the smaller frequency range of the active BWP, rather than monitor the whole carrier bandwidth.

5G NR beamforming Millimeter Wave (mmWave) wireless systems support UEs operating with single wideband carrier and UEs operating with intra-band carrier aggregation (CA) over the same contiguous spectrum simultaneously. However, for intra-band non-contiguous spectrum in a licensed band, the resource aggregation may result in multiple serving radio access technologies (RATs) to be non-contiguous along frequency domain. For intra-band contiguous or non-contiguous spectrum based on listen-before talk (LBT) result in an unlicensed band, the resource aggregation may result in multiple serving RATs to be occupied over different 20 MHz subchannels at different time, as a base station (BS) or a UE needs to perform LBT per subchannel before data transmission. The multiple serving RATs for intra-band contiguous or non-contiguous spectrum in a licensed or an unlicensed band can be configured as independent carriers under CA. However, CA increases signaling overhead as each independent carrier requires its own control channel. Further, due to different LBT results in subchannels, the radio resources of some subchannels would be wasted.

In accordance with one novel aspect, BWP definition is extended to cluster BWPs to aggregate distributed spectrum blocks within a frequency range (e.g., 200 MHz) by single carrier operation and facilitate UE to filter out the transmission of unknown RAT between any two of the distributed spectrum blocks. In addition, the cluster BWP configuration enables dynamic aggregation of the number and location of the distributed spectrum blocks based on LBT results. Traditionally, a BWP consists of a continuous range of physical resource blocks (PRBs) in frequency domain and whose occupied bandwidth is the subset of the bandwidth of the associated carrier. In this invention, the BWP definition is extended from a set of contiguous PRBs in frequency domain within a carrier to a group of one or multiple radio resource clusters, each of which contains a set of contiguous PRBs in frequency domain within the associated carrier. In the example of FIG. 1, in step 112, UE 102 receives broadcasted MIB/SIB that contains configuration for an initial DL BWP and UL BWP for initial access and RACH procedure in step 113. In step 114, UE 102 may report its BWP capability to BS 101. In step 115, either single-cluster BWP or multi-cluster BWP that are UE-specific can be further configured to UE 102 via dedicated RRC signaling. The information for each radio resource cluster in the configured BWPs can be utilized by UE 102 for serving RAT filtering.

Figure 2:
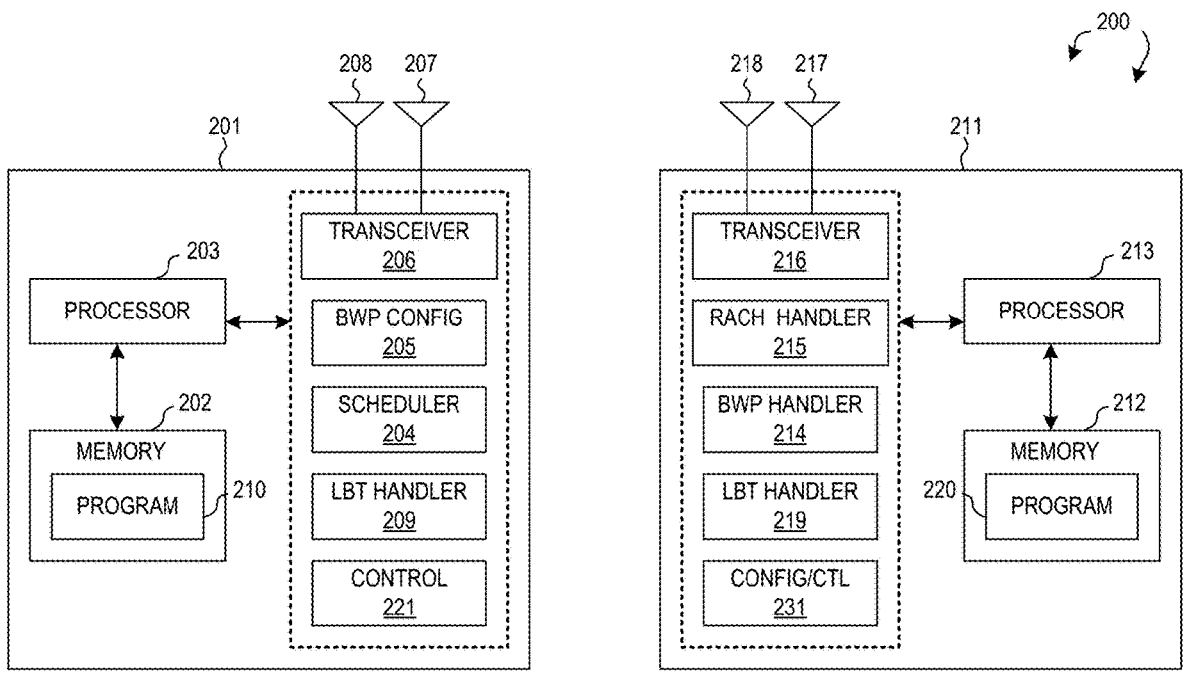
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a BWP configuration circuit 205, a scheduler 204, an LBT handling circuit 209, and a control circuit 221. Wireless device 211 is a user equipment that includes a RACH handling circuit 215, a BWP handling circuit 214, an LBT handling circuit 219, and a BWP configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow BS 201 and UE 211 to perform embodiments of the present invention accordingly.

In one example, BS 201 provides BWP configuration for BWP activation and switching for UE 211 via BWP configuration circuit 205. BS 201 schedules control and data transmission via scheduler 204. BS 201 performs LBT via LBT via LBT handling circuit 209, and provides other control information to UE 211 via controller 221. UE 211 performs RACH via RACH handling circuit 215, performs BWP functionalities via BWP handling circuit 214, and performs LBT via LBT handling circuit 219 in unlicensed band. UE 211 handles BWP configuration for BWP activation and switching via configuration and control circuit 231. Based on the cluster BWP configuration, UE 211 aggregates distributed spectrum blocks within a frequency range (e.g., 200 MHz) by single carrier operation and filters out the transmission of unknown RAT between any two of the distributed spectrum blocks. In unlicensed spectrum, UE 211 can dynamically aggregate the distributed spectrum blocks based on LBT results.

Figure 3:
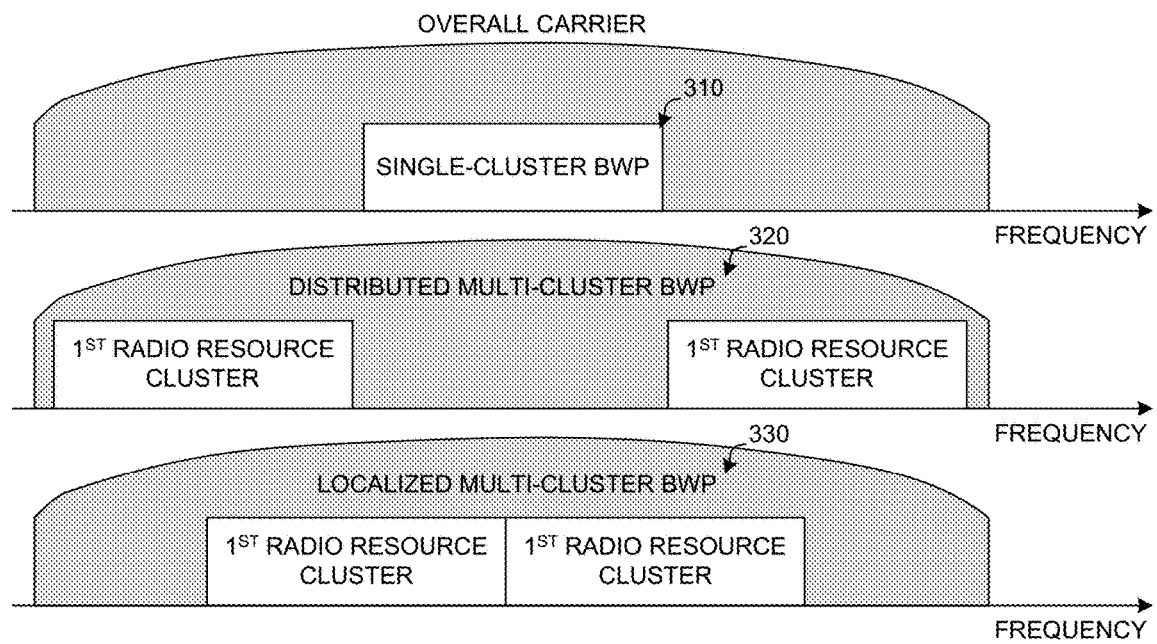
FIG. 3 illustrates a single-cluster BWP and a distributed multiple-cluster BWP and a localized multiple-cluster BWP in a wideband carrier.

FIG. 3 illustrates a single-cluster BWP and a distributed multiple-cluster BWP and a localized multiple-cluster BWP in a wideband carrier. A BWP consists of a group of one or multiple radio resource clusters, each of which contains a set of contiguous PRBs in frequency domain within the associated carrier. The bandwidth of a BWP in a carrier is the subset of the carrier bandwidth, where the carrier bandwidth is divided into multiple continuous frequency band with a smaller bandwidth, and the bandwidth size ranges from the synchronization signal (SS) block bandwidth to the maximal bandwidth capability supported by a UE in a component carrier. For a connected-mode UE, one or multiple BWP configurations for each component carrier can be semi-statically signaled to the UE and the configuration parameters at least include: numerology (i.e., CP type, subcarrier spacing); frequency location (the offset between BWP and a reference point is implicitly or explicitly indicated to UE) based on common PRB index for a given numerology; bandwidth size (in terms of PRBs); Control Resource Set (CORESET) (required for each BWP configuration in case of single active DL BWP for a given time instant).

As illustrated in FIG. 3, a single-cluster BWP 310, e.g., a single radio resource cluster, contains a set of contiguous RBs in frequency domain within a carrier. The RRC configuration for a single-cluster BWP includes at least the following information: the starting RB of the BWP, the ending RB or bandwidth of the BWP, subcarrier spacing of the BWP, and cyclic prefix of the BWP. On the other hand, multi-cluster BWP, e.g., multiple radio resource clusters, each of which contains a set of contiguous RBs in frequency domain within a carrier. The radio resource clusters within a BWP can either overlap with or orthogonal to each other in frequency domain. The radio resource clusters can be either distributed (e.g., distributed multi-cluster BWP 320) or localized (e.g., localized multi-cluster BWP 330). The RRC configuration of an N-cluster BWP, where N is an integer, includes at least the following information: The starting RB index of each radio resource cluster in the BWP, the ending RB index or bandwidth of each radio resource cluster in the BWP, the RB index of the above starting or ending RB is relative to the lowest RB within a carrier based on the subcarrier spacing of the BWP, subcarrier spacing of the BWP, and cyclic prefix of the BWP.

Figure 4:
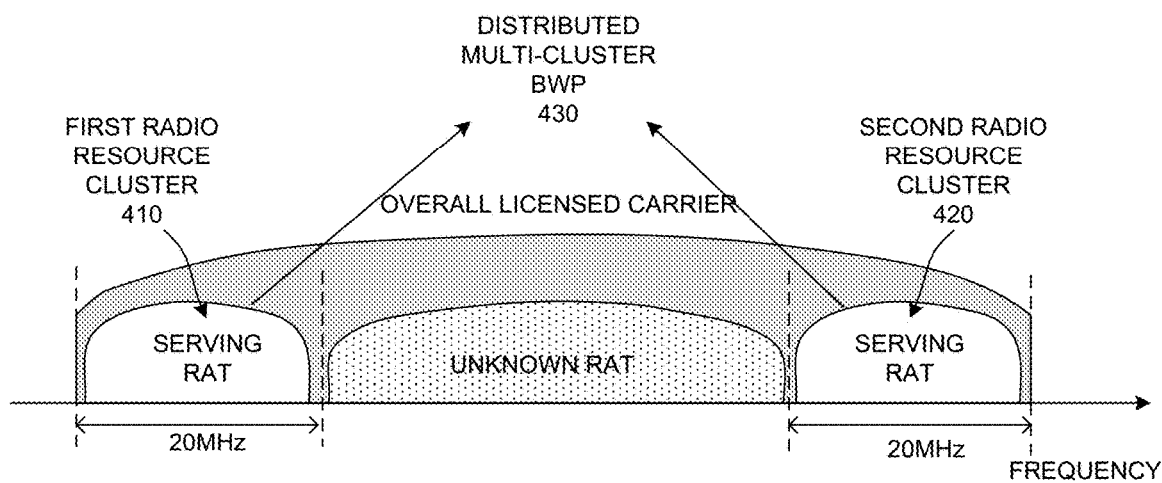
FIG. 4 illustrates one embodiment of using cluster BWP for intra-band non-contiguous spectrum operation in a licensed carrier.

FIG. 4 illustrates one embodiment of using cluster BWP for intra-band non-contiguous spectrum operation in a licensed carrier. In the embodiment of FIG. 4, the overall licensed carrier comprises a first serving RAT 410 with 20 MHz subchannel, a second serving RAT 420 with 20 MHz subchannel, and the two serving RATs are non-contiguous as they are separated by unknown RAT or occupied by another operator. Under CA, the two different subchannels can be configured as independent component carriers, but at the cost of extra signaling overhead. Under the novel definition of cluster-based BWP, a distributed multi-cluster BWP 430 can be defined under a single carrier or serving cell. The distributed multi-cluster BWP 430 comprises a first radio resource cluster, which corresponds to the first serving RAT subchannel 410, and a second radio resource cluster, which corresponds to the second serving RAT subchannel 420. As a result, only one of the radio-resource clusters within the BWP has to contain essential control information for initial access, control, configuration, and DL/UL scheduling.

Figure 5:
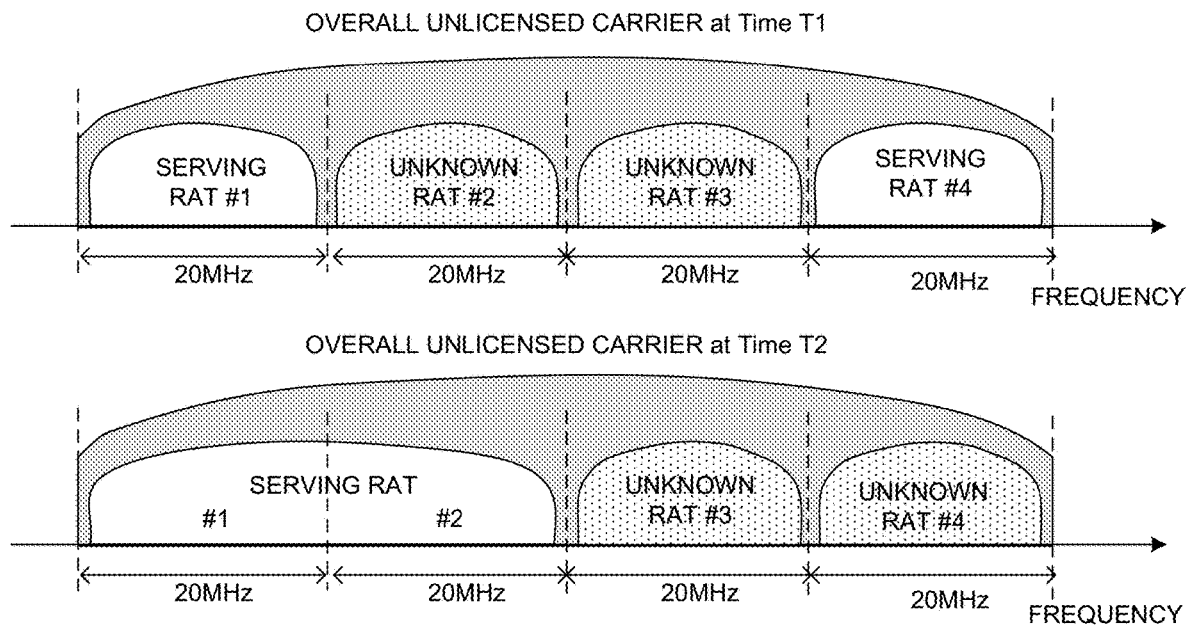
FIG. 5 illustrates one embodiment of using cluster BWP for intra-band non-contiguous spectrum operation in an unlicensed carrier.

FIG. 5 illustrates one embodiment of using cluster BWP for intra-band non-contiguous spectrum operation in an unlicensed carrier. In the embodiment of FIG. 5, the overall unlicensed carrier (e.g., 5 GHz) comprises multiple serving RATs with 20 MHz subchannels as defined. Base station and UE need to perform LBT per subchannel before data transmission. A base station or UE can transmit data only in the subchannels where LBT is successfully passed. As a result, there could be contiguous or non-contiguous subchannels for a serving RAT due to different LBT results in subchannels. For example, at time T1, serving RAT #1 and serving RAT #4 are non-contiguous as they are separated by two 20 MHz subchannels occupied by unknown RAT; at time T2, serving RAT #1 and serving RAT #2 happen to be contiguous along frequency domain. Under CA, the four different subchannels can be configured as independent component carriers, but at the cost of extra signaling overhead. Under the novel definition of cluster-based BWP, a multi-cluster BWP can be defined for UE under a single carrier or serving cell. For example, when a UE's active DL BWP is a multi-cluster DL BWP, the UE filters the received signal based on the frequency-domain properties (e.g. bandwidth and relative frequency location) of the configured clusters and detects a special serving RAT PHY-layer signal/channel to determine whether the serving gNB transmits a serving RAT signal in each cluster. If the UE determines by the detection result that there is serving RAT signal in a cluster, the UE proceeds to further process the received signal in the cluster; otherwise, the UE drops the received signal in the cluster.

Figure 6:
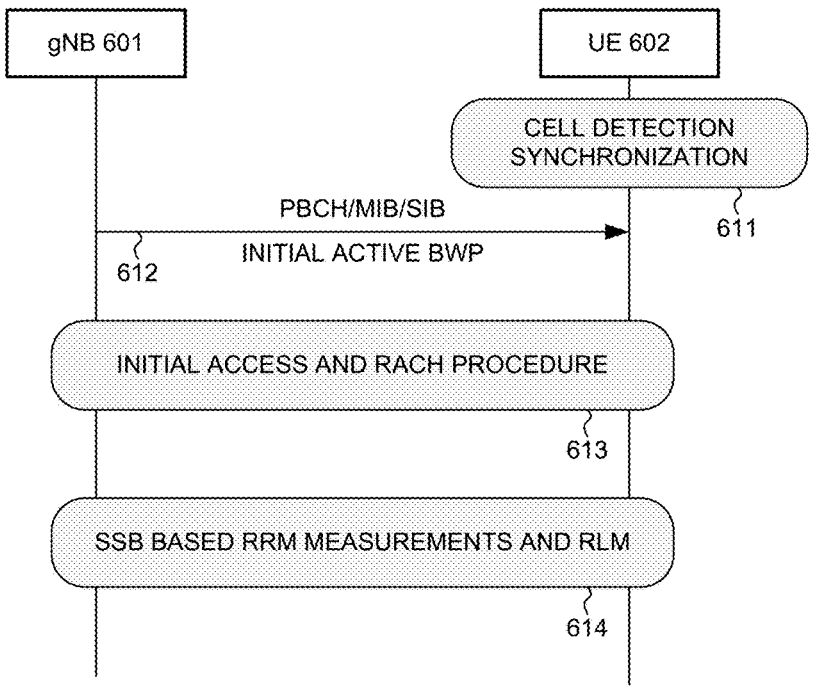
FIG. 6 illustrates a sequence flow between a base station and a user equipment for initial access and RACH procedure involving cluster BWP.

FIG. 6 illustrates a sequence flow between a base station and a user equipment for initial access and RACH procedure involving cluster BWP. A UE performs initial access in an initial DL BWP of the serving cell (e.g., the primary cell Pcell); a UE also performs RACH procedure in the initial DL BWP and initial UL BWP of the Pcell. The initial DL BWP is initially defined by the essential DL control resource set (e.g. CORESET #0), which is configured in the master information block (MIB) carried in physical broadcast channel (PBCH) for a UE to receive the essential system information blocks (SIBs) carried in physical downlink shared channel (PDSCH), e.g. SIB1 or SIB2, which is scheduled via downlink control information (DCI) carried in physical downlink control channel (PDCCH) in the essential DL CORESET (e.g. CORESET #0). The initial DL BWP defined by the essential DL CORESET (e.g. CORESET #0) shall be a single-cluster BWP. The initial DL BWP can be further configured to a UE in the essential SIBs and the initial UL BWP is also configured to a UE in the essential SIBs (e.g. SIB1/2 in 5G NR). The initial DL BWP configured in the essential SIBs by the network can be either a single-cluster DL BWP or multi-cluster DL BWP. The initial UL BWP configured in the essential SIBs by the network can be either a single-cluster UL BWP or a multi-cluster UL BWP. If the initial DL BWP is a multi-cluster DL BWP, one of the radio resource clusters within the initial DL BWP shall contain the essential DL CORESET (e.g. CORESET #0) and synchronization signal block (SSB) for a UE to receive broadcast message, perform RACH procedure and perform SSB related measurements, e.g. SSB based radio resource management (RRM) measurement and radio link monitoring (RLM). If the initial UL BWP is a multi-cluster BWP, one of the radio-resource clusters within the initial UL BWP shall contain RACH resources for a UE to perform RACH procedure. For unlicensed spectrum, if the initial UL BWP is a multi-cluster BWP, each radio resource cluster within the initial UL BWP shall contain RACH resources for a UE to perform RACH procedure because which radio resource cluster can be used for RACH procedure is unknown before LBT. However, only when all UEs served by the network support a DL BWP (or UL BWP) with up to N radio resource clusters, where N is an integer, the network can configure a UE the initial DL BWP (or initial UL BWP) as a DL BWP (or UL BWP) with up to N radio resource clusters.

In the example of FIG. 6, in step 611, UE 602 performs cell detection and synchronization, which detects a serving cell and synchronizes with the serving cell by gNB 601. In step 612, UE 602 acquires system information provided by gNB 601, e.g., master information block (MIB) carried in physical broadcast channel (PBCH). The MIB contains the essential DL CORESET configuration, which defines the initial DL BWP. The essential SIBs scheduled via the essential DL CORESET further configure the initial DL BWP and the initial UL BWP. The essential DL CORESET (e.g. CORESET #0) and SSB is contained in at least one radio resource clusters within the initial DL BWP, for UE to receive broadcast message, perform RACH procedure and perform SSB related measurements. In step 613, UE 602 performs a RACH procedure with gNB 601. The RACH resource for UE to perform RACH is contained in at least one radio resource clusters within the initial UL BWP for licensed spectrum, or is contained in each radio resource cluster within the initial UL BWP for unlicensed spectrum. In step 614, UE 602 performs SSB based RRM measurement and RLM using the initial DL BWP.

Figure 7:
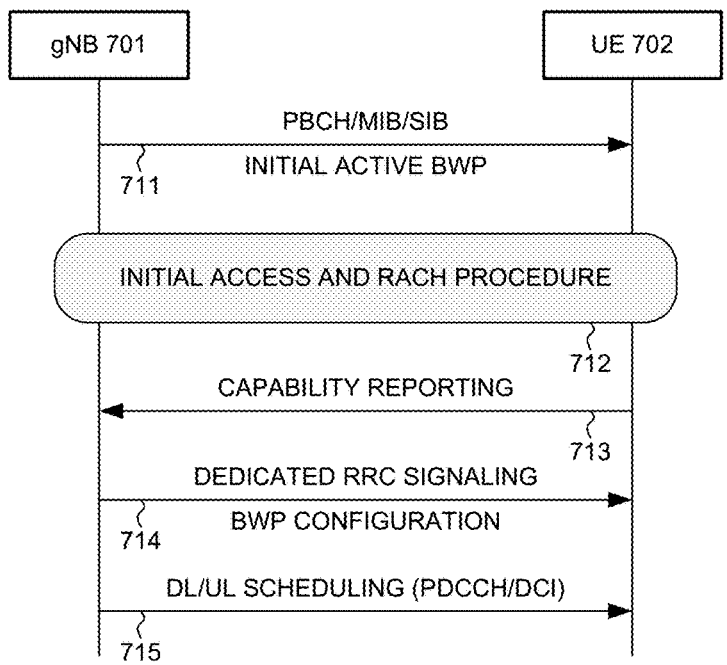
FIG. 7 illustrates a sequence flow between a base station and a user equipment for capability negotiation and RRC configuration involving cluster BWP.

FIG. 7 illustrates a sequence flow between a base station and a user equipment for capability negotiation and RRC configuration involving cluster BWP. In step 711, UE 702 acquires system information provided by gNB 701, e.g., master information block (MIB) carried in physical broadcast channel (PBCH). The MIB contains the essential DL CORESET configuration, which defines the initial DL BWP for initial access. The essential SIBs scheduled via the essential DL CORESET further configure the initial DL BWP and the initial UL BWP. In step 712, UE 702 performs a RACH procedure with gNB 701, operating in the initial DL BWP and the initial UL BWP. After RACH procedure, in step 713, UE 702 reports its BWP capability to the network on the maximal number of radio resource clusters of a UE-specific DL BWP and the maximal number of radio resource clusters of a UE-specific UL BWP. After UE capability negotiation, in step 714, UE 702 receives one or multiple UE-specific BWP configurations from the network through dedicated RRC signals. Each UE-specific BWP configuration can be either a single-cluster BWP or a multi-cluster BWP. In addition to UE-specific BWP configuration, the UE also receives CORESET configurations, each of which is associated to a DL BWP. When a CORESET is associated with a DL BWP, the frequency-domain location of the CORESET shall be within the DL BWP no matter it's a single-cluster BWP or a multi-cluster BWP. The network shall not configure to a UE a DL BWP (or UL BWP) with a number of radio resource clusters larger than the UE capability reported to the network.

If a UE-specific DL BWP is a multi-cluster DL BWP, at least one of radio resource clusters within the UE-specific DL BWP shall be associated with at least one CORESET for DL/UL scheduling. For unlicensed spectrum, if a UE-specific DL BWP is a multi-cluster DL BWP, each radio resource cluster within the UE-specific DL BWP shall be associated with at least one CORESET for DL/UL scheduling because which radio resource cluster can be used for DL/UL scheduling is unknown before LBT. If a UE-specific UL BWP is a multi-cluster UL BWP, at least one of radio resource clusters within the UE-specific UL BWP shall contain RACH resources for RACH procedure and PUCCH resources for HARQ-ACK feedback and CSI report. For unlicensed spectrum, if a UE-specific UL BWP is a multi-cluster UL BWP, each radio resource cluster within the UE-specific UL BWP shall contain RACH resources for a UE to perform RACH procedure and PUCCH resources for a UE to perform HARQ-ACK feedback and CSI report because which radio resource cluster can be used for a UE to perform RACH procedure, HARQ-ACK feedback and CSI report is unknown before LBT. In step 715, UE 702 receives DL/UL scheduling and performs DL reception and UL transmission accordingly.

Figure 8:
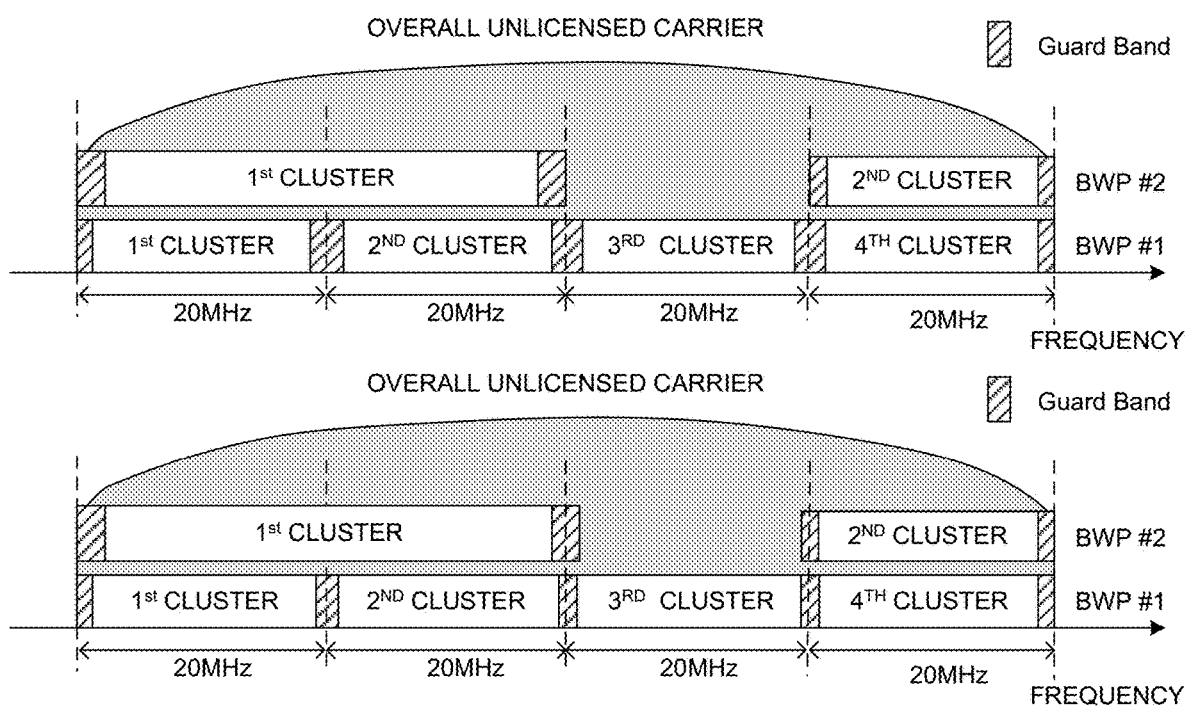
FIG. 8 illustrates embodiments of DL/UL scheduling and guard bands involving cluster BWP.

FIG. 8 illustrates embodiments of DL/UL scheduling and guard bands involving cluster BWP. The bitfield size of the frequency-domain resource allocation in the DCI is based on the aggregated radio resources within a BWP no matter it's a single-cluster BWP or a multi-cluster BWP. The aggregated radio resources within a BWP are indexed by RB from the lower frequency location to the higher frequency location within clusters of a BWP based on the subcarrier spacing of the BWP. Single DCI is used to schedule a PDSCH (or PUSCH) in the DL (or UL) BWP no matter it's a single-cluster DL (or UL) BWP or a multi-cluster DL (or UL) BWP. For unlicensed spectrum, one or multiple multi-cluster BWPs can be configured for a wideband carrier operation and each radio resource cluster of a BWP corresponds to one or multiple 20 MHz subchannels, as shown in FIG. 8. In FIG. 8, there is one 80 MHz unlicensed carrier and two BWPs are configured to a UE. BWP #1 has 4 consecutive radio resource clusters and each cluster corresponds to one 20 MHz subchannel. BWP #2 has 2 distributed radio resource clusters and $1^{st}$ cluster spans over two 20 MHz subchannels while $2^{nd}$ cluster corresponds to one 20 MHz subchannel.

For DL in unlicensed spectrum, if the active DL BWP is BWP #1 for a UE and each radio resource cluster in BWP #1 corresponds to a subchannel, the base station performs LBT over each radio resource cluster in BWP #1 and transmits the serving RAT signal over the radio resource cluster(s) where LBT passes. The subchannel can be either defined for a frequency band or configured by the network. UE then filters the received signal in each radio resource cluster in BWP #1, performs serving RAT signal detection in each radio resource cluster in BWP #1, and decodes the serving RAT signal in the radio resource cluster(s) where the serving RAT signal is detected. Similarly, if the active DL BWP is BWP #2 for a UE and part of radio resource clusters in BWP #2 consist of multiple subchannels, the base station performs LBT over each radio resource cluster in BWP #2 and transmits the serving RAT signal over the radio resource cluster(s) where LBT passes. UE then filters the received signal in each radio resource cluster in BWP #2, performs serving RAT signal detection in each radio resource cluster in BWP #2, and decodes the serving RAT signal in the radio resource cluster(s) where the serving RAT signal is detected.

For UL in unlicensed spectrum, if the active UL BWP is BWP #1 for a UE and each radio resource cluster in BWP #1 corresponds to a subchannel defined in the unlicensed spectrum, UE performs LBT over each radio resource cluster in BWP #1 and transmits the serving RAT signal over the radio resource cluster(s) where LBT passes. Similarly, if the active UL BWP is BWP #2 for a UE and part of radio resource clusters in BWP #2 consist of multiple subchannels, UE performs LBT over each radio resource cluster in BWP #2 and transmits the serving RAT signal over the radio resource cluster(s) where LBT passes.

To accommodate the transition band of a filter, which is used by the UE to filter the received (or transmitted) signal, guard bands can be reserved at two frequency sides of each radio resource cluster within a DL BWP (or UL BWP), as shown in FIG. 8. Although FIG. 8 illustrates one example for unlicensed spectrum, the same function can be used in licensed spectrum as well. The bandwidth size of the reserved guard bands at two frequency sides of a radio resource cluster at least depends on the bandwidth size of the radio resource cluster. When a serving RAT signal is scheduled to be received or transmitted in a radio resource cluster in an active DL or UL BWP, the serving RAT signal is not scheduled in the guard bands of the radio resource cluster. For robustness, non-shared guard band between two contiguous clusters, as shown in FIG. 8(a), is preferred because whether the neighboring clusters can be used for serving RAT signal transmission is unknown and how much transmission power of the unknown RAT signal in the neighboring clusters can be is also unknown. For spectrum efficiency, shared guard band between two contiguous clusters, as shown in FIG. 8(b), is preferred if neighboring clusters can be used for serving RAT signal transmission or if the transmission power level of the unknown RAT signal in the neighboring clusters is known to be comparable to the serving RAT signal.

Figure 9:
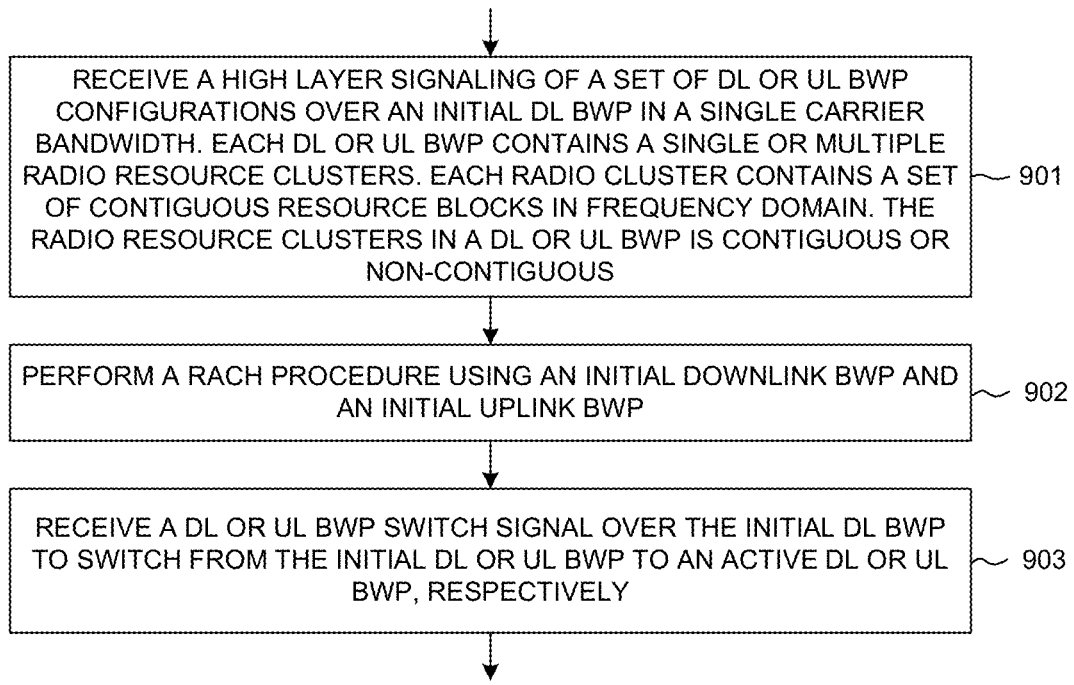
FIG. 9 is a flow chart of a method of wideband operation for intra-band non-contiguous spectrum using cluster BWP configuration in accordance with one novel aspect.

FIG. 9 is a flow chart of a method of wideband operation for intra-band non-contiguous spectrum using cluster BWP configuration in accordance with one novel aspect. In step 901, a UE receives a high-layer signaling of a set of downlink (DL) or uplink (UL) bandwidth part (BWP) configurations from a base station over an initial DL BWP in a single carrier bandwidth. Each DL or UL BWP contains a single or multiple radio resource clusters. Each radio resource cluster contains a set of contiguous resource blocks (RBs) in frequency domain. The radio resource clusters in a DL or UL BWP is contiguous or non-contiguous. In step 902, the UE performs a random-access channel (RACH) procedure using the initial DL BWP and an initial uplink (UL) BWP. In step 903, the UE receives a DL or UL BWP switch signal over the initial DL BWP to switch from the initial DL or UL BWP to an active DL or UL BWP, respectively.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a high-layer signaling of a set of UE-specific downlink (DL) or uplink (UL) bandwidth part (BWP) configurations from a base station by a user equipment (UE) over an initial DL BWP in a single carrier bandwidth, wherein a single UE-specific DL or UL BWP contains multiple radio resource clusters, wherein each radio resource cluster contains a set of contiguous resource blocks (RBs) in frequency domain, wherein all the multiple radio resource clusters of the single UE-specific DL or UL BWP always apply the same numerology including the same OFDM subcarrier spacing and the same cyclic prefix length of the single UE-specific DL or UL BWP,
   wherein guard bands are reserved at two sides of and within each radio resource cluster in the single UE-specific DL or UL BWP in frequency domain;
   performing a random-access channel (RACH) procedure using the initial DL BWP and an initial uplink (UL) BWP; and
   receiving a DL or UL BWP switch signal over the initial DL BWP to switch from the initial DL or UL BWP to an active DL or UL BWP, respectively.

2. The method of claim 1, wherein the set of DL or UL BWP configurations for a BWP comprises a starting RB index of each radio cluster in the BWP, an ending RB index or a bandwidth of each radio cluster in the BWP, a subcarrier spacing, and a cyclic prefix.

3. The method of claim 1, wherein the initial DL BWP is defined by an essential DL control resource set (CORESET) configuration contained in master essential system information.

4. The method of claim 3, wherein the initial DL BWP and the initial UL BWP are further configured by secondary essential system information.

5. The method of claim 4, wherein the initial DL BWP is a multi-cluster BWP, and wherein one of the radio resource clusters within the initial DL BWP contains an essential DL control resource set (CORESET).

6. The method of claim 4, wherein the initial UL BWP is a multi-cluster BWP, wherein one of the radio resource clusters within the initial UL BWP contains RACH resource for licensed spectrum, wherein each radio resource cluster within the initial UL BWP contains RACH resource for unlicensed spectrum.

7. The method of claim 1, wherein the UE reports UE BWP capability to the base station, the UE BWP capability comprises a maximal number of radio resource clusters of a UE-specific DL BWP and a maximal number of radio resource clusters of a UE-specific UL BWP.

8. The method of claim 1, further comprising:
aggregating and indexing RBs of all radio resource clusters within the active DL or UL BWP; and
determining RBs of a scheduled physical DL or UL shared channel based on scheduling information and the indexing of the aggregated RBs.

9. The method of claim 8, wherein the aggregated RBs within the active DL or UL BWP is indexed by RBs from a lower frequency location to a higher frequency location based on a subcarrier spacing of the active DL or UL BWP.

10. The method of claim 1, wherein the UE filters received signal in each radio resource cluster in the active DL BWP in an unlicensed spectrum, wherein the UE performs serving RAT signal detection and decoding in each radio resource cluster in the active DL BWP.

11. The method of claim 1, wherein the UE performs Listen Before Talk (LBT) in the active UL BWP in an unlicensed spectrum, wherein the UE transmits serving RAT signal in a radio cluster with successful LBT.

12. A User Equipment (UE) comprising:
a receiver that receives a high-layer signaling of a set of UE-specific downlink (DL) or uplink (UL) bandwidth part (BWP) configurations from a base station over an initial DL BWP in a single carrier bandwidth, wherein a single UE-specific DL or UL BWP contains multiple radio resource clusters, wherein each radio resource cluster contains a set of contiguous resource blocks (RBs) in frequency domain, wherein all the multiple radio resource clusters of the single UE-specific DL or UL BWP sham always apply the same numerology including the same OFDM subcarrier spacing and the same cyclic prefix length of the single UE-specific DL or UL BWP, and wherein guard bands are reserved at two sides of each radio resource cluster in the single UE-specific DL or UL BWP in frequency domain;
a random-access channel (RACH) handling circuit that performs a RACH procedure using the initial DL BWP and an initial uplink (UL) BWP; and
a BWP handling circuit that receives a DL or UL BWP switch signal over the initial DL BWP such that the UE switches from the initial DL or UL BWP to an active DL or UL BWP, respectively.

13. The UE of claim 12, wherein the set of DL or UL BWP configurations for a BWP comprises a starting RB index of each radio cluster in the BWP, an ending RB index or a bandwidth of each radio cluster in the BWP, a subcarrier spacing, and a cyclic prefix.

14. The UE of claim 12, wherein the initial DL BWP is defined by an essential DL control resource set (CORESET) configuration contained in master essential system information.

15. The UE of claim 14, wherein the initial DL BWP and the initial UL BWP are further configured by secondary essential system information.

16. The UE of claim 15, wherein the initial DL BWP is a multi-cluster BWP, and wherein one of the radio resource clusters within the initial DL BWP contains an essential DL control resource set (CORESET).

17. The UE of claim 15, wherein the initial UL BWP is a multi-cluster BWP, wherein one of the radio resource clusters within the initial UL BWP contains RACH resource for licensed spectrum, and wherein each radio resource cluster within the initial UL BWP contains RACH resource for unlicensed spectrum.

18. The UE of claim 12, wherein the UE reports UE BWP capability to the base station, the UE BWP capability comprises a maximal number of radio resource clusters of a UE-specific DL BWP and a maximal number of radio resource clusters of a UE-specific UL BWP.

19. The UE of claim 12, wherein the UE aggregates RBs of all radio resource clusters within the active DL or UL BWP, and determines RBs of a scheduled physical DL or UL shared channel based on scheduling information and indexing of the aggregated RBs.

20. The UE of claim 19, wherein the aggregated RBs within the active DL or UL BWP is indexed by RBs from a lower frequency location to a higher frequency location based on a subcarrier spacing of the active DL or UL BWP.

21. The UE of claim 12, wherein the UE filters received signal in each radio resource cluster in the active DL BWP in an unlicensed spectrum, wherein the UE performs serving RAT signal detection and decoding in each radio resource cluster in the active DL BWP.

22. A method comprising:
receiving a high-layer signaling of a set of UE-specific downlink (DL) or uplink (UL) bandwidth parts (BWPs) for a serving cell from a base station by a user equipment (UE) over an initial DL BWP in a primary cell, wherein a BWP configuration of each UE-specific DL or UL BWP in the higher-layer signaling includes at least a set of radio resource clusters;
determining frequency locations of each one of the set of radio resource clusters of a UE-specific DL or UL BWP based on a set of contiguous physical resource blocks (PRBs) and a same numerology of the UE-specific DL or UL BWP, wherein guard bands are reserved at two sides of and within each radio resource cluster in each of the UE-specific DL or UL BWPs in frequency domain; and
receiving a DL or UL BWP switch signal over the initial DL BWP to switch an active DL or UL BWP from one DL or UL BWP to another DL or UL BWP for the serving cell, respectively.

* * * * *